United States Patent
Clark et al.

(10) Patent No.: US 10,394,888 B2
(45) Date of Patent: Aug. 27, 2019

(54) VIDEO SEARCH SYSTEM AND METHOD

(71) Applicant: British Broadcasting Corporation, London (GB)

(72) Inventors: Benjamin Richard Clark, London (GB); Jana Eggink, London (GB)

(73) Assignee: British Broadcasting Corporation, London (GB)

( * ) Notice: Subject to any disclaimer, the term of this patent is extended or adjusted under 35 U.S.C. 154(b) by 32 days.

(21) Appl. No.: 15/715,621

(22) Filed: Sep. 26, 2017

(65) Prior Publication Data

US 2018/0089204 A1  Mar. 29, 2018

(51) Int. Cl.
*G06F 16/78*  (2019.01)
*G06K 9/00*  (2006.01)
*G06F 16/783*  (2019.01)

(52) U.S. Cl.
CPC ........ *G06F 16/7867* (2019.01); *G06F 16/783* (2019.01); *G06K 9/00758* (2013.01); *G06K 9/00765* (2013.01)

(58) Field of Classification Search
CPC .... G06Q 10/10; G06Q 20/1235; H04L 67/10; H04L 67/12; G06K 9/00744; G06K 9/00845; G06K 9/00288; G06K 9/00765; G06K 9/4647; G06K 9/4671; G06K 9/4676; G06K 9/6215; G06K 2019/06253; G06K 9/34; G06K 9/00711; G06K 9/209; G06K 19/06037; G06K 9/00758; G06K 9/6201; G06F 3/013; G06F 17/30784; G06F 17/3082; G06F 17/30876; G06F 17/30781; G06T 2207/10016; G06T 2207/30242; G06T 1/0071; G06T 7/215; H04N 21/26266; H04N 19/167; H04N 19/31; H04N 19/107; H04N 1/00005; H04N 1/00037; H04N 2201/3205; H04N 2201/3226; H04N 19/176; H04N 19/503; H04N 21/21805; H04N 21/44008; H04N 21/8126; H04N 5/144; H04N 5/145; H04N 5/222; H04N 5/232; H04N 5/23238; H04N 7/181; H04N 7/183; H04N 1/00846;

(Continued)

(56) References Cited

U.S. PATENT DOCUMENTS

| | | | |
|---|---|---|---|
| 7,653,133 B2 * | 1/2010 | Woods | H04N 19/119 348/699 |
| 2003/0086496 A1 * | 5/2003 | Zhang | G06K 9/00711 375/240.16 |

(Continued)

OTHER PUBLICATIONS

Extended Search Report dated Dec. 12, 2017 for PCT Application No. 17275153.9, 9 pages.

*Primary Examiner* — Aklilu K Woldemariam
(74) *Attorney, Agent, or Firm* — Daly, Crowley, Mofford & Durkee, LLP

(57) ABSTRACT

Methods and apparatus for identifying one or more locations of a video clip within video content. In embodiments, a method comprises producing segments of the video clip, comparing the segments of the video clip to segments of the video content, and producing a first measure of similarity of the video clip to the video content at relatively displaced temporal positions. A method can further include filtering and comparing to identify, from a second measure of similarity, the one or more locations of the video clip within the video content.

14 Claims, 2 Drawing Sheets

(58) Field of Classification Search
CPC ............. H04N 1/32251; H04N 21/858; H04N 19/142; H04N 19/61; H04N 5/147; H04N 19/102; H04N 19/105; H04N 19/114; H04N 19/13; H04N 19/137; H04N 19/139; H04N 19/172; H04N 19/182; H04N 19/19; H04N 19/527; H04N 19/543; H04N 19/615; H04N 19/63; H04N 19/87; H04N 21/42202; H04N 21/4402; H04N 5/57; B42D 25/305; G07D 7/004; G11B 27/28; G09G 2320/043; G09G 2320/0646; G09G 2320/0653; G09G 2320/0666; G09G 2320/0673; G09G 2330/021; G09G 2360/144; G09G 2360/16; G09G 3/3426
USPC ........ 382/128, 224, 236, 240; 348/169, 170, 348/465, 700
See application file for complete search history.

(56) References Cited

U.S. PATENT DOCUMENTS

| | | | | |
|---|---|---|---|---|
| 2003/0103645 A1* | 6/2003 | Levy | .................... | G06K 7/1417 382/100 |
| 2004/0125877 A1* | 7/2004 | Chang | ................. | G06K 9/00335 375/240.28 |
| 2004/0255249 A1* | 12/2004 | Chang | ................. | G06K 9/3266 715/723 |
| 2005/0169371 A1* | 8/2005 | Lee | ...................... | H04N 19/105 375/240.03 |
| 2007/0031052 A1* | 2/2007 | Turaga | ................. | H04N 19/105 382/240 |
| 2009/0141178 A1* | 6/2009 | Kerofsky | ............. | G09G 3/3426 348/700 |
| 2009/0154806 A1* | 6/2009 | Chang | ................. | G06K 9/00758 382/173 |
| 2010/0049711 A1* | 2/2010 | Singh | .................. | G06K 9/00744 707/758 |
| 2011/0035373 A1 | 2/2011 | Berg et al. | | |
| 2012/0051658 A1* | 3/2012 | Tong | .................... | G11B 27/034 382/224 |
| 2012/0177249 A1* | 7/2012 | Levy | ...................... | G06K 9/325 382/103 |
| 2013/0055087 A1* | 2/2013 | Flint | .................... | G11B 27/034 715/723 |
| 2014/0096002 A1* | 4/2014 | Dey | ...................... | G06F 3/0488 715/723 |
| 2014/0098886 A1* | 4/2014 | Crenshaw | ............ | H04N 19/176 375/240.16 |
| 2016/0275356 A1* | 9/2016 | Kuwahara | ......... | G08B 13/19669 |

\* cited by examiner

VIDEO SEARCH SYSTEM AND METHOD

CROSS REFERENCE TO RELATED APPLICATIONS

The present application claims priority to GB Application No. 1616567.2, filed on Sep. 29, 2016, which is incorporated herein by reference

BACKGROUND OF THE INVENTION

This invention relates to searching video content to identify one or more locations of a video clip within that content.

Existing approaches to searching for the presence of a video clip within video content, including fingerprint techniques, typically perform a two stage matching process. The first step is very fast but might produce some false matches, while the second step is very accurate but slow. The first step is therefore used to narrow down the search space for the second one.

Video portions that are very dissimilar are generally easy to exclude in the first step, while parts that are somewhat similar to the search query but not close enough to be considered a match are likely to end up in the second slow matching process, increasing computation time significantly.

SUMMARY OF THE INVENTION

We have appreciated the need for improved search techniques to improve speed and computational efficiency. We have further appreciated that similar but incorrect matches are often temporally close to the correct match in the same video file, such as extensions of a scene. A video file might also have repeated correct matches, such as in repeated news segments.

The invention is defined in the claims to which reference is directed.

In broad terms, the invention provides an arrangement that uses a matching pattern of a query against video content, such as long video file, to filter out incorrect near matches but retain repeated true matches. For example, individual spikes in similarity probably contain repeated true matches, while similarity values that are high but vary little just indicate scenes with little change such as talk-shows, without there being repeated correct matches.

An embodiment of the invention has a two stage search. The first search compares segments derived from multiple frames of video and the second search compares features from individual frames of the video clip with features from frames of the matching segments. In between, a filtering step is used to exclude some potential matches from the second search.

This provides various advantages. Using a temporal matching pattern to exclude certain parts of a video from detailed matching improves rejection of false positives whilst avoiding the rejection of true positives. The temporal pattern used can be learned from examples, or based on prior knowledge such as genre, or based on statistical distribution of the similarity values. The computation of a temporal matching pattern to provide the filtering step is significantly less than a frame by frame comparison, as would be needed if false positives were not accurately rejected. Such a filtering step can speed up searches in large video archives significantly (for example, an order of magnitude in one implementation).

BRIEF DESCRIPTION OF THE DRAWINGS

The invention will now be described in more detail by way of example with reference to the drawings, in which.

DETAILED DESCRIPTION OF THE PREFERRED EMBODIMENTS

The invention may be embodied in a method of processing video signals to identifying one or more locations of a video clip within video content, devices for performing such processing, transmitters, receivers and systems involving such a method.

Figure 1:
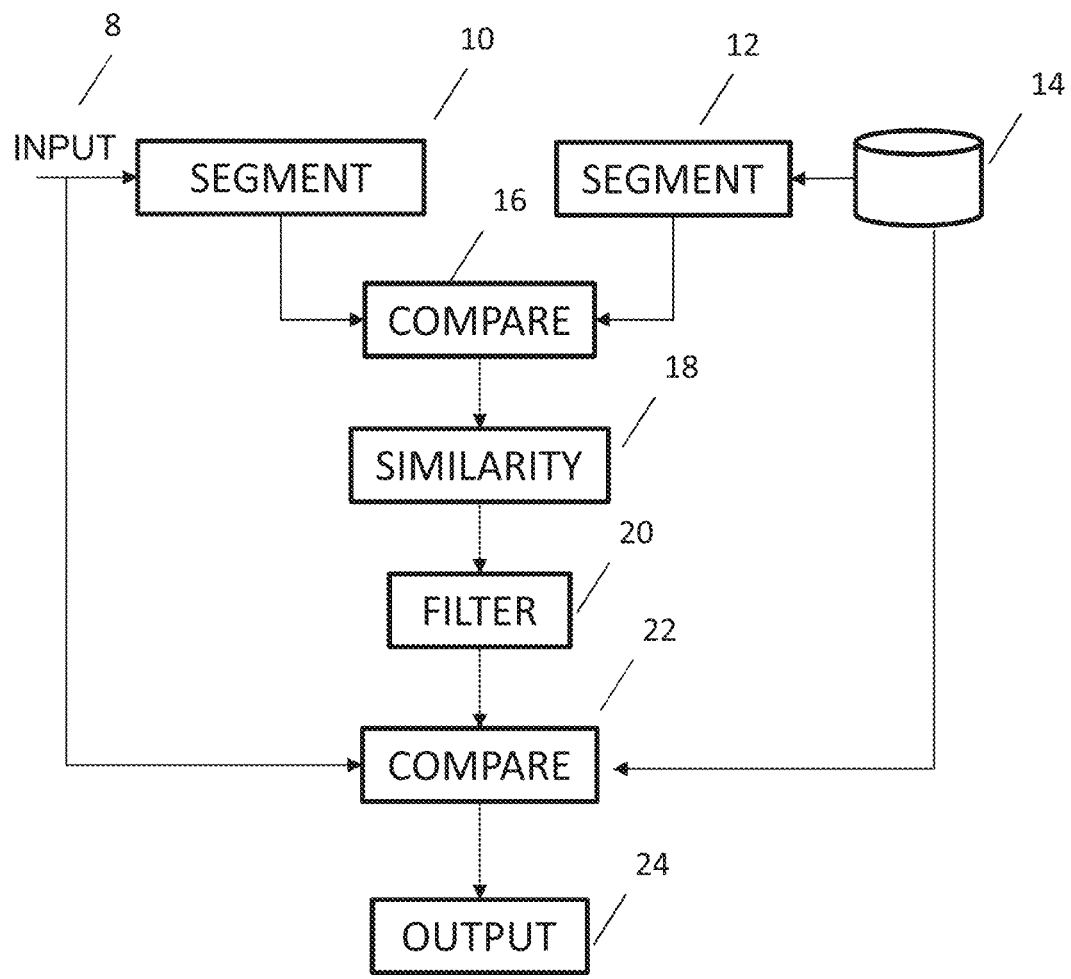
FIG. 1: shows a system embodying the invention.

FIG. 1 shows an embodying system arranged to receive an input 8 of video clips and to determine the presence of such video clips within video content such as from a store of video 14. The system provides an output signal at output 24 that may then be used to control other devices such as for retrieving video content containing the video clip, asserting a warning or any other such control.

A video clip received at the input 8 comprises a sequence of frames. Similarly, video content in the store 14 comprises video clips, video programmes or indeed an entire repository of video. It would be computationally inefficient to compare the received video clip on a frame by frame basis against video from the repository 14 and so a first step is to produce segments from the received video clip and from the video against which the video clip is to be compared. A segment is an abstract description of multiple frames which can be produced by various techniques to reduce the frames to a simpler data representation. The segment thereby represents the multiple frames in a simpler manner and may be referred to as a signature. A similar process is operated on the video from the store 14. As an alternative, the segments for the video in the store 14 may be already processed and stored in advance as segments in addition to the original video.

The preferred process for producing segments from sequences of frames is to use a fingerprint computation. We will now describe various fingerprint techniques that may be used to produce the segments, first describing a fingerprint of one frame and then a fingerprint of multiple frames.

A frame fingerprint is a representation of a single frame of video. For example, each frame of the uncompressed video is down-sampled to 16×16 pixels, and only luminance is used, with all colour information disregarded. Haar-like features consisting of three blocks (a positive centre with negative neighbours) are computed in horizontal and vertical orientation, centred on all but the edge pixels. The resulting values are quantised to just three values, minus one, zero, and one. A negative value means the area in the centre pixel is darker than the surrounding ones, zero means they are approximately the same value, and a positive number mean the central pixel (or block in the original image) is lighter.

The frame is then further down-sampled to 8×8 and 4×4 pixels, with the same Haar-like features computed at every resolution, leading to 472 features in total in our implementation. These features very roughly act as a line detector on different resolutions of the image. Other features could also be used, as long as they are local to specific areas of the image. The advantage of the ones used is that they are very fast to compute, and have been shown to perform well.

As noted above, an initial frame by frame comparison is too computationally expensive, and so a segment is produced in the first step. A segment may also be referred to as a segment fingerprint. Segments aggregate the information from multiple consecutive frames to enable faster search. A segment-based search cannot establish exact matching boundaries, as these might fall in the middle of a segment. It is acceptable that segment matching returns some false matches, as a second stage frame-based matching can later discard these. It is less acceptable if the segment-based search misses true matches, as they cannot be recovered easily. The main purpose of the segment based search is to narrow down the search space for the slower frame based matching.

The segments are preferably occurrence histograms of the frame based features. Each segments spans a number frames (for example 75, equivalent to three seconds in standard broadcast video of 25 frames per second), with 50% overlap. The length of the segments is configurable. Longer segments result in a smaller database that is faster to search, but the reduced temporal resolution means that very short matching video clips might not be detected. The occurrence histograms are computed by summing up the individual feature values of all frames belonging to this segment, meaning the segment features have the same size as the frame-based features, 472 in our implementation.

Figure 3:
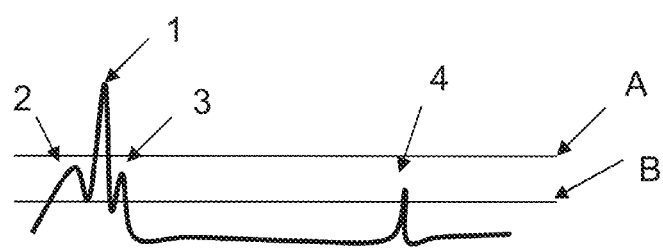
FIG. 3: is a graphical view of a measure of similarity and the impact of differing filter thresholds.

The segments of the input video clip and segments of video from the repository 14 are provided to a comparison unit 16 in which a comparison is performed. The comparison involves comparing each segment of the video clip to a time sequence of segments of video from the store. The comparison is provided to a similarity unit 18 which produces a measure of similarity for each segment of the video clip against segments derived from groups of frames at consecutive positions of the video from the store 14. The output of the similarity unit 18 may be thought of as a time varying similarity measure, the time being the relative displacement of the segment being tested and the video from the store 14. An example such time varying similarity measure is shown in FIG. 3.

The search is thus carried out in two stages. The first is segment based, as described above, in which matching segments are selected from the database for each segment of the video clip. We consider a segment to be a match when its features are close to those of the query segment. This means that the differences of the individual feature values have to be beneath a pre-defined threshold, for example +−10. Small differences can occur even between exact video clip duplications due to different alignments of the segments. We also know that some common editorial modifications, such as logo overlay, can strongly change local features around the area of the modification. We therefore also allow some of our 472 segment features to be outside the +−10 threshold. We consider a segment to be a match if at least 90% of all its features are in a range of +−10 compared to the query segment features.

The second stage frame-based matching described later only compares the frames of segments considered to be a match in the segment matching process, because frame-based matching is computationally expensive. Firstly, the best possible alignment between two segments is computed by comparing the frame-based features at all possible offsets and selecting the one with the lowest overall difference. Using the best matching frame at this offset as a seed, temporally adjacent matching frames are joined into final matches using one-dimensional region growing. Neighbouring matching segments are included in the region growing, so that the final matches can span multiple segments.

For any practical large database application, search speed and scalability are important. The first segment based matching step can be carried out using indexed databases and is extremely fast. This is not the case for the second step which requires operations on individual frames. Reducing the number of frame-based comparisons on parts of the video that ultimately do not produce valid matches is therefore important for any large scale application.

Analysis has shown that a large number of false segment matches typically occurs in video containing a correct match. This is not surprising, as for example longer TV programmes are more likely to display some visual similarity over their entire length than two unrelated programmes. However, in most types of content, it is extremely unlikely that identical short pieces of video are repeated in close temporal proximity without a significant gap. Longer news formats such as breakfast TV often repeat the same news bulletin, but typically do so only with a long gap of typically half an hour or more.

The embodiment therefore includes knowledge about the temporal matching pattern between two samples of video content into the decision about when to use detailed frame-based matching. The second stage of the matching process, provided by the comparison unit 22, thereby only provides a function to compare on a frame by frame basis those frames that have been determined to be candidate matches from the segment matching process. The comparison may be any type of frame by frame comparison, but preferably is by using a frame signature produced using techniques as described above and comparing against corresponding frame signatures of the comparison video data from the database 14. Preferably, the arrangement uses the frame signatures that were already derived as part of the process to produce segments.

The filter 20 provides the advantage of the embodiment over prior arrangements in the way in which the results of the first comparison are filtered so as to reduce the number of comparisons operated in the second frame by frame comparison whilst reducing the risk of excluding genuine matches. The filter 20 may be considered a temporal filter in the sense that it may exclude potential candidate matches based on a temporal pattern. For example, the temporal pattern may be candidate matches that are close in time to one another, that are near the beginning or end of a video programme, that are present in a programme that is likely to have a high degree of repetition and so on. In general, rather than simply applying a threshold of similarity value as in prior arrangements, the embodying system applies a filter that includes a temporal aspect in considering the time between measures of high similarity as part of the filtering process.

Figure 2:
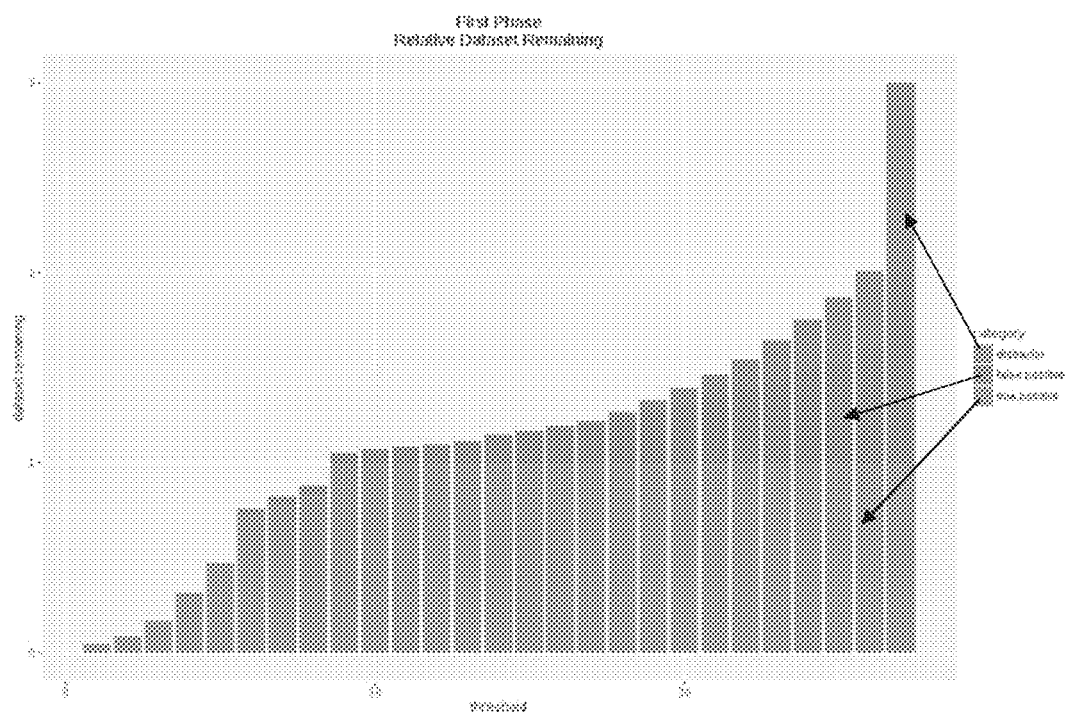
FIG. 2: is a graph showing the impact of varying a filter threshold.

FIG. 2 shows how making the threshold more permissive (increasing it) in prior approaches changes the amount and type of matching segments returned. Here we plot the proportion of the total (0-1) for three categories of segment: distractor segments which are in no way related to the query segment, true-positive segments which are from the same point in time in the same video as the query, and false positive segments which are from a different temporal part of the same video as the query. Despite there being orders of magnitude more distractor segments than false positive segments, it is relatively easy to exclude entirely unrelated video content, but harder to exclude similar content from a different part of the same program. Note that the graph displays percentages of the different categories rather than absolute numbers. The simplistic approach of simply varying a threshold is therefore not used in the embodiment of the invention. Instead, a more sophisticated approach is used using the temporal filter as previously described.

FIG. 3 shows an example result of the first stage comparison with the relative offset of segments on the X axis and the comparison value on the Y axis. The diagram is schematic so the units are not relevant. As can be seen, four peaks in similarity are shown. Peak 1 is a high peak and so apparently a good candidate match. Peaks 2 and 3 are also high but it is noted that these are either side of the higher peak, Peak 1. Peak 4 is a lower peak but is further spaced from the highest peak. Consider first if the threshold is set at the level of threshold A. In this example, only segment 1 would be passed to the second comparison stage. If the threshold was set at level B, all four peaks would be passed to the second comparison.

The embodiment improves upon the above thresholding approach by excluding matches that are within a temporal window to another, better match. If we assume there are two correct matches, 1 and 4. The second repetition has a slight modification, e.g. a logo overlay, which leads to a lower similarity score. The first repetition does not have any modifications, and slightly offset matches still produce good matches, 2 and 3. If the threshold A were used to exclude these from the expensive frame-based matching, the correct second match 4 would also be excluded. To include the second correct match, the threshold B would have to used, leading to unnecessary frame-based matching of the two false matches (with red arrows).

The embodiment implements a filter 20 that suppresses segment matches within a temporal boundary around a better match. This solves the problem described above. In our test database, this led to a speed up of roughly 10 times, without any loss in performance.

The temporal filter in the above example is therefore a window type filter that excludes (that is filters) matches that are within a given temporal distance (time) from a match with a higher similarity value. Thus, peaks 2 and 3 are excluded because peak 1 is higher and within the temporal filter distance. Such temporal filtration therefore does not require a similarity threshold such as thresholds A and B. Of course, the similarity thresholds may also be used in addition to the temporal filter. Various further types of temporal filter may be used.

The temporal filter may be adjusted temporally to vary the exclusion boundaries based on prior knowledge about the video, e.g. genre or programme length. Longer programmes and news are more likely to show repeated clips, while drama is only likely to do that as part of preview or outlook at the very beginning or end of a programme. So, the temporal filter may be set to have a small window for some genres, but a larger window for others.

Instead of setting these rules manually, the system may learn them using machine learning techniques. A learning database could be analysed using detailed frame-based matching everywhere, leading to knowledge about true and false matching segment candidates. The temporal location of these, possibly in combination with existing metadata about the videos, can then be used to train a machine learning algorithm such as an artificial neural network to decide which segments require frame-level matching.

The invention claimed is:

1. A system for identifying one or more locations of a video clip within video content, comprising;
    means for producing signatures of the video clip, each signature derived from a plurality of frames of the video clip;
    means for comparing the signatures of the video clip to signatures of the video content;
    means for producing, from the comparison of signatures, a time varying first measure of similarity of the video clip to the video content at relatively displaced consecutive temporal positions;
    means for filtering the first measure of similarity using a temporal filter to exclude potential matches based on temporal separation of positions of high measure of similarity to produce candidate matches, wherein the means for filtering is arranged to produce candidate matches by including some temporal positions having peaks in the measure of similarity but excluding other temporal positions having peaks in the measure of similarity within a threshold temporal distance of the included peaks;
    means for comparing the video clip to the video content at the positions identified as candidate matches to produce a second measure of similarity; and
    means for identifying, from the second measure of similarity, the one or more locations of the video clip within the video content, wherein each signature comprises a reduced data representation of the plurality of frames.

2. A system according to claim 1, wherein the means for filtering is arranged to adaptively vary the filtering process, preferably by varying a temporal distance.

3. A system according to claim 1, wherein the threshold temporal distance is variable.

4. A system according to claim 3, wherein the threshold temporal distance is a variable based on one or more of length of video clip, genre or proximity to the beginning or end of the clip.

5. A system according to claim 3, wherein the means for filtering is arranged to include only temporal positions having the highest peak in similarity in a temporal window.

6. A system according to claim 1, wherein the means for comparing the video clip comprises means for comparing the video clip frame by frame with the video content at the positions identified as candidate matches.

7. A system according to claim 1, wherein the means for comparing the video clip is arranged to compare on a frame by frame basis using the signature of each frame.

8. A system according to claim 1, wherein the means for identifying comprises an output arranged to assert a control signal, wherein the control signal is preferably arranged to control retrieval of video content.

9. A computer implemented method of identifying one or more locations of a video clip within video content, comprising:
    producing signatures of the video clip, each signature derived from a plurality of frames of the video clip;
    comparing the signatures of the video clip to signatures of the video content;
    producing, from the comparison of signatures, a time varying first measure of similarity of the video clip to the video content at relatively displaced consecutive temporal positions;
    filtering the first measure of similarity using a temporal filter to exclude potential matches based on temporal separation of positions of high measure of similarity to produce candidate matches, wherein the filtering is arranged to produce candidate matches by including some temporal positions having peaks in the measure of similarity but excluding other temporal positions having peaks in the measure of similarity within a threshold temporal distance of the included peaks;
    comparing the video clip to the video content at the positions identified as candidate matches to produce a second measure of similarity; and
    identifying, from the second measure of similarity, the one or more locations of the video clip within the video content, wherein each signature comprises a reduced data representation of the plurality of frames.

10. A method according to claim 9, wherein the filtering is arranged to be adaptively varied, wherein adaptively varying comprises varying a temporal distance.

11. A method according to claim 9, wherein the threshold temporal distance is variable.

12. A method according to claim 9, wherein the filtering is arranged to include only temporal positions having the highest peak in similarity in a temporal window.

13. A method according to claim 9, wherein the identifying comprises asserting a control signal, wherein the control signal is preferably arranged to control retrieval of video content.

14. A computer program comprises code which when executed on a video system undertakes the method of claim 9.

* * * * *